United States Patent [19]

Pfister et al.

[11] Patent Number: 4,692,072
[45] Date of Patent: Sep. 8, 1987

[54] TAPPING DEVICE FOR RECIPROCATIVE PRESS

[75] Inventors: William R. Pfister, Brick; William H. Pfister, Seaside Park, both of N.J.

[73] Assignee: Automated Tapping Systems Inc., Bricktown, N.J.

[21] Appl. No.: 889,206

[22] Filed: Jul. 25, 1986

[51] Int. Cl.⁴ .......................................... B23B 47/18
[52] U.S. Cl. ............................... 408/124; 10/129 A; 408/6; 408/11; 408/137
[58] Field of Search ............ 10/129 A, 129 R, 136 R; 408/6, 9, 11, 124, 137, 138, 141, 234

[56] References Cited

U.S. PATENT DOCUMENTS

| | | | |
|---|---|---|---|
| 2,314,138 | 3/1943 | Garbe et al. | 10/136 R |
| 2,715,233 | 8/1955 | Clark | 408/124 |
| 3,193,859 | 7/1965 | Pfister | 408/124 |
| 3,301,100 | 1/1967 | Hubeny | 408/6 |
| 3,339,434 | 9/1967 | Sparling | 408/6 |
| 3,400,614 | 9/1968 | de Voss | 408/9 |
| 3,579,687 | 5/1971 | Hoshi et al. | 10/129 A |
| 3,788,760 | 1/1974 | Daniels | 408/137 |

Primary Examiner—Gil Weidenfeld
Assistant Examiner—Daniel W. Howell
Attorney, Agent, or Firm—Albert F. Kronman; Thomas R. Morrison

[57] ABSTRACT

A device for simultaneously tapping threads and performing the usual operations of a punch press is described in which the tapping device is attached to the upper and lower plates of a punch press. As the punch plates are brought toward and away from each other, gear trains and helically grooved lead screws change the up and down motion into rotating motion. The gear trains also change the speed of the rotating motion which is used to drive a thread tapping tool through the metal being formed in the punch press. If there is too much force opposing the tapping operation, an electrical contact in the device is opened and the punch press stopped before the tap or tapping device can be damaged.

11 Claims, 7 Drawing Figures

TAPPING DEVICE FOR RECIPROCATIVE PRESS

BACKGROUND OF THE INVENTION

Apparatus for tapping threads in a work piece while at the same time performing stamping operations in a punch press or the like has been known and disclosed in U.S. Pat. No. 3,193,859. Such devices, however, required substantial modification to the punch press die set, resulting in substantial expense and loss of time in setting up the job. Misalignment of the work piece due to improper feeding often caused tap breakage requiring time consuming tap replacement. The prior art device continued to operate even after the taps became dull, another cause of tap breakage.

Accordingly, it is an object of the present invention to overcome the disadvantages of prior art devices.

Another object of the present invention is to provide a tapping device for reciprocating presses in which the punch holder die set need not be modified.

A further object of the present invention is to provide a tapping device for reciprocating presses which requires less time to set up and change to various job requirements.

Still another object of the present invention is to provide a tapping device for punch presses which will stop operating before damage to the tap, under improper tool or work piece conditions.

SUMMARY

A tapping apparatus for cutting threads in a work piece carried by a punch press or similar reciprocating machine while the said machine is performing other cutting or stamping operations, according to the present invention comprises a top plate, a bottom plate, a top gear block secured to the top plate, a bottom gear block secured to the bottom plate. A series of parallel, helically grooved, spaced, cam shafts are rotatably carried between the top and bottom gear blocks and normal thereto. A series of gears constituting a gear train is carried within the said blocks. The gears are drivably coupled to the cam shafts so that vertical movement of the top plate is translated by the cam shafts into rotational movement of the gears. A thread tapping station is secured to one end of the bottom gear block. The thread tapping station rotatably carries a thread cutting tap operatively coupled to one of the gear trains. Electrical sensing means on the thread tapping station cuts off power to the punch press when machine malfunction causes upward motion of the tap.

BRIEF DESCRIPTION OF THE DRAWINGS

In the accompanying drawings forming part hereof, similar reference characters designate corresponding parts and in which.

DETAILED DESCRIPTION

Figure 1:
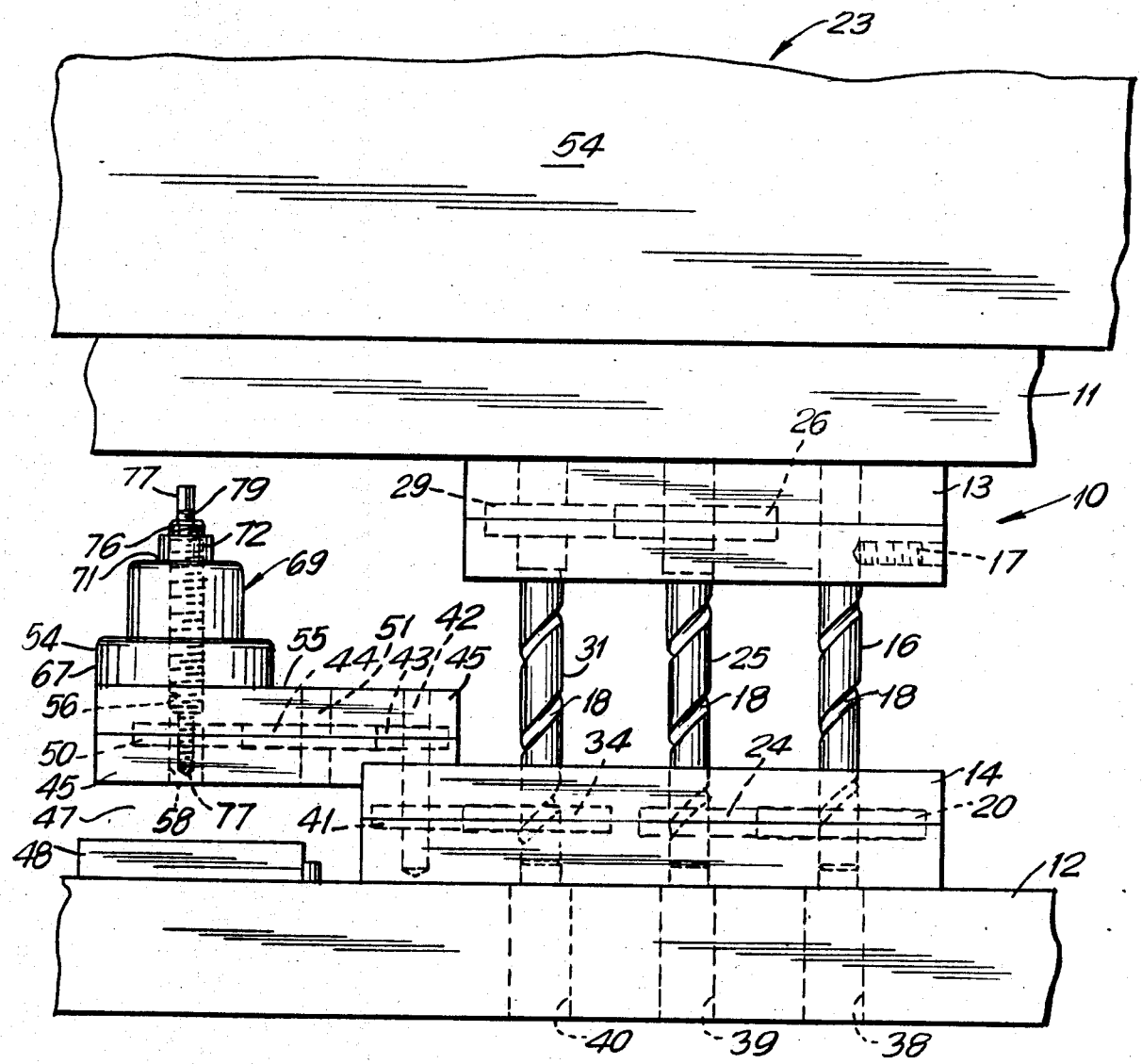
FIG. 1 is a view in side elevation of a thread tapping attachment according to the present invention with certain internal parts shown in dashed lines.
Figure 6:
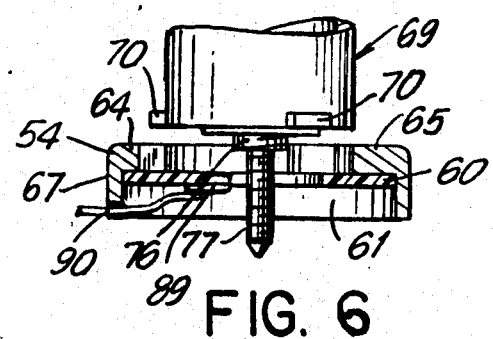
FIG. 6 is a view, partly in cross-section of the bottom of the tap holder somewhat enlarged.
Figure 7:
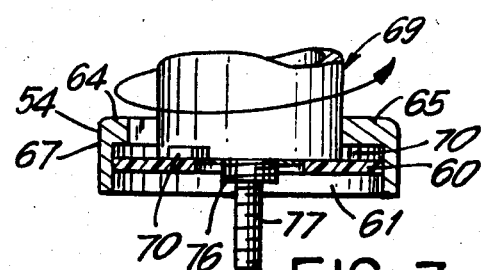
FIG. 7 is a view in elevation showing the engagement of the tap holder to the tapping station.
Figure 2:
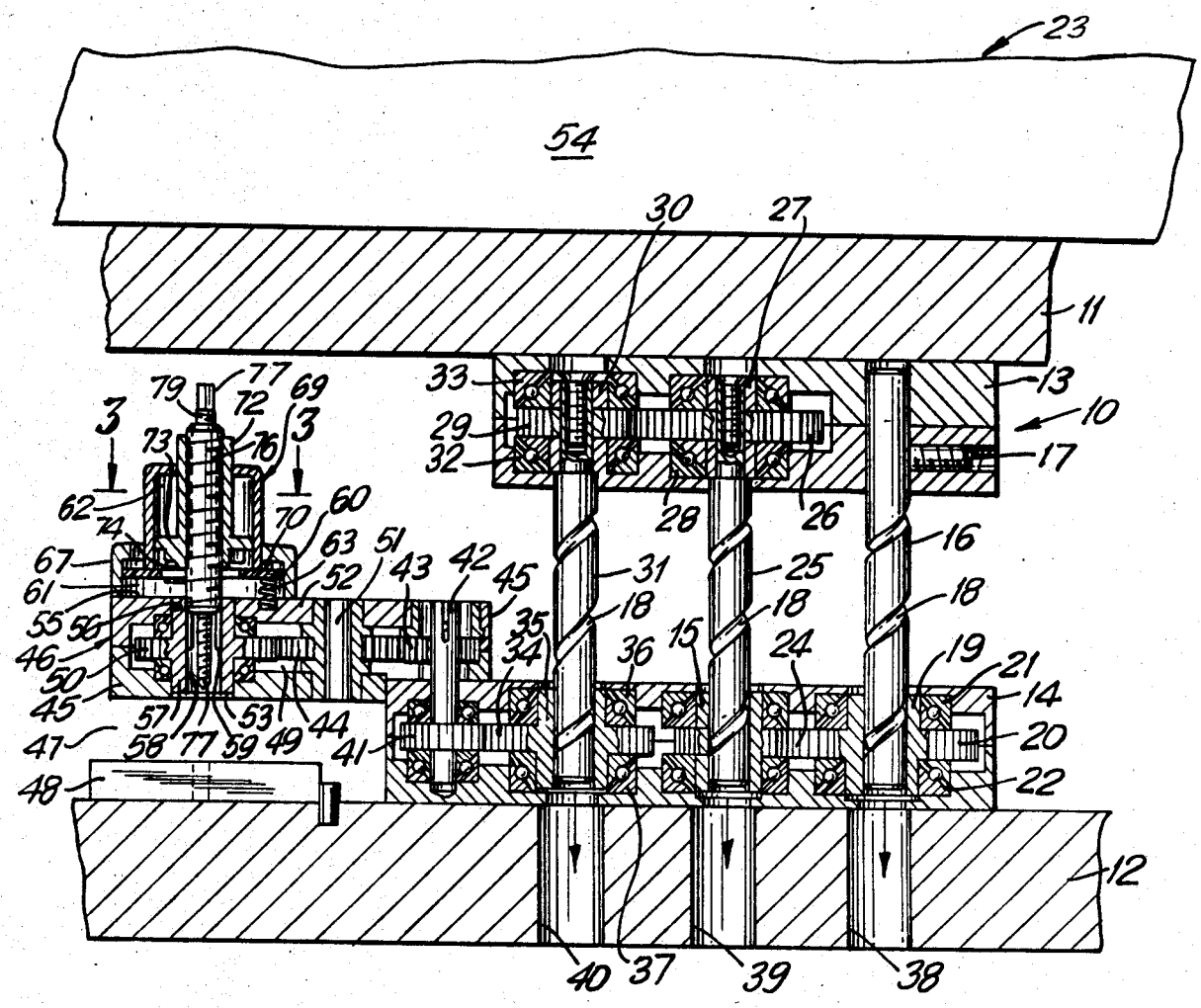
FIG. 2 is a view similar to FIG. 1 in partial longitudinal section.

In the accompanying drawings, and particularly FIGS. 1 and 2, 10 indicates a thread tapping attachment having an opposed top plate 11 and a bottom plate 12. A top gear block 13 is secured to the top plate 11 and a bottom gear block 14 is secured to the bottom plate 12. The gear blocks are attached to the plates by screws (not shown).

A first cam shaft 16 is secured to the top gear block 13 by some suitable means such as the set screw 17 shown in FIG. 2. The major portion of the cam shaft 16 is provided with a helical groove 18 which engages a helically splined bushing 19, carried within the bottom gear block 14.

The bushing 19 is press fitted into a first gear 20 which is freely carried within the bottom gear block 14 upon ball bearings 21, 22. It will be apparent that the vertical motion of the first cam shaft 16 will rotate the bushing 19 and first gear 20 within the gear block 14.

The first gear 20 is in mesh with a second gear 24 (hereinafter the floating gear) which is carried within the bottom gear block 14. The floating gear 24 has a helically splined bushing 15, similar to bushing 19 in the first gear, to receive a second helically grooved cam shaft 25 therethrough. The floating gear 24 is smaller than the first gear 20 to achieve a speed step up of the rotary motion. Speed of rotation is further increased by the rotation of the second cam shaft 25 as it moves through the bushing 15 during the stroke of the punch press 23.

A third gear 26 is secured to the top of the second cam shaft 25 as by a key, pin or other suitable means (Not shown). The rotary movement of the second cam shaft is thereby transferred to the third gear 26. At the top of the second cam shaft there is provided a bushing 27 within which the top of said second cam shaft turns. Ball bearings 28 within the top gear block 13 freely support the end of the bushing 27 and the gear 26.

The third gear 26 is in mesh with a fourth gear 29 carried within the top gear block 13. A bushing 30 is secured to a third cam shaft 31 around the said cam shaft. The bushing 30 and fourth gear 29 are rotatably supported by ball bearings 32, 33. Rotational motion of the fourth gear 29 and vertical movement of the third cam shaft 31 is transferred to a fifth gear 34 carried within the bottom gear block 14. Here again, the fifth gear is secured to a splined bushing 35 through which the third cam shaft 31 slides freely supported by ball bearings 36, 37.

It will be seen from an examination of FIGS. 1 and 2 that the bottom plate 12 is provided with three spaced parallel bores 38, 39, 40 to freely receive the three cam shafts 16, 25, 31 as they are thrust down by the top plate 11. The floating gear 24 makes this possible and eliminates the need for a bore in the top plate 11 as was required by the teaching of prior art U.S. Pat. No. 3,193,859. As a result, the need for a thick, heavy top plate to be added to the structure of the press 23 or like machine is avoided, thereby reducing the amount of energy necessary to operate the press, increasing the amount of space between the top and bottom plates available for tooling and reducing the time required to set up the press for tapping operations.

The fifth gear 34 is in mesh with a small pinion gear 41 formed on the end of an arbor 42. A second pinion gear 43 is formed near the opposite end of the arbor and is in mesh with a idler gear 44. Both second pinion gear and the idler gear are carried within the base 45 of a tapping station 46. The tapping station base is rigidly secured to or integral with the bottom gear block in such manner that it cantalevers outwardly therefrom and extends above the top surface of the bottom plate 12 to provide a gap 47 to receive a work part 48.

The tapping station base 45 is provided with a chamber 49 within which the pinion gear 43, the idler gear 44 and a tap chuck driving gear 50 are rotatably carried. The tap chuck driving gear is in mesh with the idler gear 44 as shown as the left in FIGS. 1 and 2. The idler gear is carried by a small shaft 51 journaled in the top and bottom portions 52, 53 of the tapping station base 45.

It will be seen from an examination of FIGS. 1 and 2 and the foregoing description that as the reciprocating member 54 of the punch press 23, to which the top plate 11 is secured, descends all of the helically grooved cam shafts 16, 25, 31 will be driven in the direction of the bottom plate 12, through the gears 20, 24 and 34 and partially through the three bores 38-40 in the bottom plate 12. As a result, the linear or reciprocating motion of the punch press is translated into rotary motion by the splined connection of gears 20, 24 and 34 with the helical grooves 18 in the cam shafts 16, 25, 31. The speed of the rotary motion is further controlled by the gear trains in the upper and lower gear blocks 13, 14.

A heavy ring 67, best shown in FIGS. 1, 3, 4 and 7, hereinafter the locking ring, is secured to the top surface 55 of the tapping station base 45. The base is bored as shown at 56 to receive the upper end of the shaft 57 which carries the tap chuck driving gear 50. The shaft 57 is centrally bored as shown at 58 in FIG. 2 and provided with internally extending spaced longitudinal keys 59.

The ring 67 is divided into two chambers by a flat plate 60, hereinafter the spring plate made of some suitable dielectric material, defining the top of a large chamber 61 and the bottom of a smaller chamber 62. Coil springs 63 carried between the top surface 55 of the tapping station base 45 and the spring plate 60, yieldably urge the spring plate toward an inwardly extending flange 64 at the top of the ring 67. The flange is divided into a series of spaced segments 65 by cut out portions 66 (see FIG. 3).

The notched opening 68 within the flange 64 is of a size to receive the open end of a cup shaped tapping head 69. Outwardly extending detents 70 are formed on the bottom of the tapping head. The size and spacing of the detents are such that they are freely received through the cut out portion 66 of the flange 64 of the ring 67.

Figure 4:
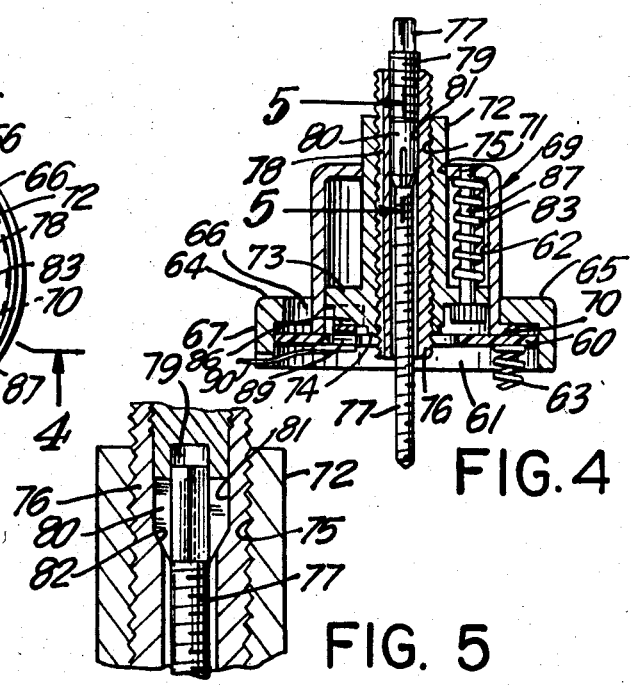
FIG. 4 is a fragmentary cross-sectional view taken on line 4—4 in FIG. 3.
Figure 5:
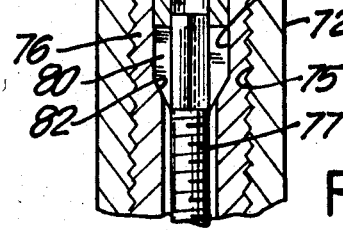
FIG. 5 is a fragmentary cross-sectional view taken on line 5—5 in FIG. 4 somewhat enlarged.

An opening in the top or end wall 72 of the tapping head 69 freely receives an elongated lead screw bushing 72. The lead screw bushing is substantially cylindrical, except for an outwardly extending flange 73 spaced from the bottom 74 thereof. In addition, the lead screw bushing is internally threaded for its entire length as shown in FIGS. 4 and 5 at 75 to threadably receive a lead screw 76.

The lead screw 76 serves to advance the tap 77 through the tapping head 69 and into the work part 48 as the lead screw is rotated. Rotary motion is provided to the lead screw 76 by longitudinal key ways 78 cut into the threaded portion of said lead screw (see FIG. 3). The key ways 78 are of a width to freely receive the keys 59 within the hollow shaft 57 of the tap chuck driving gear 50. The lead screw 76 is further longitudinally bored with a two diameter bore 81 and internally threaded at its upper or larger diameter with a left hand thread for a portion of its length to receive a tap chuck 79, as best shown in FIGS. 4 and 5 at 80.

When the tap 77 is slipped into the jaws 80 of the tap chuck 79 and threaded down until the jaws bear against the bevel 82 between the two diameters of the bore 81, the tap will be secured within the tap chuck 79 and extend beyond the lower end of the lead screw 72 in the direction of the work piece 48. In order to bring the tapping head into position for thread tapping, it must first be slipped into the locking ring 67 until the detents 70 clear the bottom surface of the segments 65 of the flange 64. A short rotation of the tapping head will then bring the detents into locked position beneath the flange 64. The spring plate 60 carried within the locking ring 67 by reason of the coil springs 63 urges the detents 70 against the inner surface of the flange 64 to prevent accidental release.

Quick replacement or inspection of the tap is possible by merely rotating the tapping head enough to bring the detents 70 into alignment with the cut out portions 66 of the flange 64 and lifting the tapping head clear of the locking ring 67.

It will be seen from an examination of FIGS. 2, 3 and 4 that the bottom flange 73 is machined to form a substantially triangular block 85, the extremities of which are in the form of points 86 (hereinafter called contact points). The flange between the contact points is bored to receive a plurality of screws 87. The screws extend into the tapping head 69 and are threaded into the top of the tapping head (see FIG. 4). Coil springs 88 slipped over the screws 87 yieldably urge the bushing in the direction of the work part.

Figure 3:
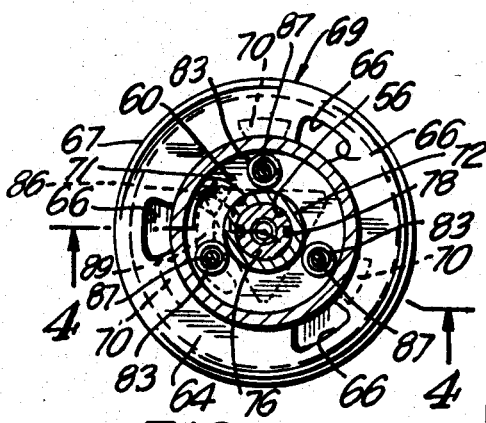
FIG. 3 is a cross-sectional view taken on line 3—3 in FIG. 2, somewhat enlarged.

An electrically conductive arcuate strip 89 is carried upon the upper surface of the spring plate 60 as best shown in FIGS. 3 and 4. The strip 89 is disposed in the path of the contact points 86 on the flange block 85 so that as the tapping head 69 is inserted into the locking ring 67 and rotated to lock the detents 70 beneath the ring flange 64, a good electrical wiping contact is made between at least one of the contact points and the conductive strip 89. The conductive strip 89 is connected to the electrical circuit lines 90 of the power source and provides a positive ground for said circuit so that if the contact between the contact points and the conductive strip is broken, the power source will be cut off. This aspect of the apparatus forms a safety or "fail safe" structure as hereinafter more fully described.

In the event the tap 77 is misaligned with respect to the hole in the work part which is to be threaded or should the tap become dull, as the top plate 11 comes down, advancing the lead screw toward the bottom plate 12, the increased pressure on the end of the tap will cause it to drive the lead screw bushing 72 upwardly. The upward movement of the lead screw bushing will cause the lead screw bushing flange 73 to compress the coil springs 83 in the tapping head 67. The lower coil springs 63 which bear against the spring plate 60 will balance the said plate at all times. As the lead screw continues to move up, the electrical contact between the contact points and the conductive strip 89 will be broken and the power source interrupted. A small movement in this direction will be sufficient for this purpose.

In the event that the tapping head 69 should become dislodged or improperly inserted in the locking ring 67, there will be no contact between the contact points and the conductive strip 89 so that the punch press cannot be started. This fail safe operation of the tapping device can prevent damage not only to the tap but also to the tapping head 69 and the surrounding structure.

In one satisfactory embodiment of the present invention with the punch press operating at a stroke speed of between 80 to 110 strokes per minute, satisfactory tapping was achieved using a 10-24 tap with a 24 pitch cam shaft. The first gear 20 was formed with forty teeth, the second gear 24 (the floating gear) had twenty teeth, the third gear 26 which is keyed to the helical cam shaft 25 had forty teeth, the fourth gear 29 had twenty teeth, the fifth gear 34 had thirty six teeth, the pinion gear 41 had twenty teeth, the second pinion gear 43 had twenty teeth, the idler gear 44 had forty teeth and the tap driving gear had thirty teeth. The helical grooves in the cam shafts had a ratio of 2 to 3, providing five turns per inch of stroke. The cam shaft turned one and one-half times in one travel. It will be seen from the foregoing description that changing taps and lead screws is a quick, simple operation with the present apparatus. All that is required is to turn the tapping head enough to bring the outwardly extending detents 70 into register with the notched openings 68 in the locking ring 67 and withdraw it together with the lead screw and the tap. The cam shafts in the tapping head 69 may then be removed and a desired lead screw having the necessary pitch substituted, together with the corresponding tap. The tapping head 69 may then be locked into the locking ring 67 and the tapping operation begun. Because of the fact that all of the cam shafts travel in the same direction during operation of the press, that is, downwardly through the bottom plate 12, of the press through bores 38, 39, 40 almost any punch press can be used with the present invention. Prior art devices for this purpose required one of the cam shafts to move upwardly as the jaws of the press closed and an elongated bore of the order of 5½" to 6" long had to be provided to receive the cam shaft. Such prior art devices required that the top plate 11 of the press be very thick in order to accommodate the bore, thereby decreasing the shut distance of the press and modifications of the standard top plate.

The operation of the tapping device will be apparent from the foregoing description; as the work part 48 is advanced through the reciprocating press, and if properly positioned, the jaws of the press descend and the various tools in the press perform their punching and forming functions. At the same time the top gear block 13 is forced downwardly by the top plate 11 thereby causing the gear trains in the top and bottom gear blocks 13, 14 and cam shafts 16, 25, 31 to rotate the gears within the tapping station 46 which drives the lead screw bushing 72 thereby rotating the said bushing and advancing the tap into the hole in the work part 48. At the end of the punching and tapping stroke the jaws of the press are separated, thereby reversing the travel of the gears and withdrawing the tap from the work part preparatory to the next cycle.

The tapping device described herein provides advantages over presently known devices for the following reasons:

1. The lighter construction of the top plate of the press results in a saving of weight and therefore energy.

2. Modification of the top plate of the press is not required, resulting in the usefulness of the tapping device on a larger number of standard presses.

3. The fail safe feature protects machine components, taps and operating personnel.

4. The construction of the tapping station permits ease of replacement, change of taps and lead screws, thereby reducing set up and maintenance time.

5. By having all of the helically grooved cam shafts move in the same direction with respect to the top and bottom plates, there is a decrease in the required shut height of the press.

Having thus fully described the invention, what is desired to be secured by Letters Patent and claimed is:

We claim:

1. A tapping device for a punch press or the like comprising a top plate, a bottom plate opposite the top plate, electrical power means to reciprocate the top plate with respect to the bottom plate, a top gear block secured to the top plate, a bottom gear block secured to the bottom plate, a gear train carried within each of the gear blocks, a helically grooved first cam shaft secured at one end to the top gear box and extending therefrom, a first helically splined bushing carried within the bottom gear box in driving engagement with the first cam shaft, a first gear within the bottom gear train around the first bushing and secured thereto, a floating second gear within the bottom gear train in mesh with said first gear, a second helically grooved cam shaft operatively coupled at one end to the floating second gear and extending outwardly thereof toward the top gear block, a second helically splined bushing within the top gear block in driving engagement with the second camp shaft, a third gear within the top gear train around the second bushing and secured thereto, a fourth gear within the top gear train in mesh with the third gear, a third helically grooved cam shaft, secured at one end to the fourth gear and extending outwardly thereof toward the bottom gear block, a third helically splined bushing within the bottom gear block in driving engagement with the third cam shaft, a fifth gear around the third bushing and secured thereto, an extension on the bottom gear block, a pinion gear member within the extension in mesh with the fifth gear, a tap receiving tapping station carried by the extension, a chuck assembly on the tapping station, a chuck driving gear in the chuck assembly, a tapping head on the said station, a threaded bushing in said tapping head for advancing the chuck toward a work part, a speed reducing gear train interconnecting the pinion gear member and chuck driving gear, whereby rapid reciprocation of the top and bottom plates toward and away from each other will be translated into rotation of the chuck assembly at a suitable tapping speed, fail safe means within the tapping head responsive to vertical movement of the threaded bushing to interrupt the plate reciprocation means, said first, second and third helically grooved cam shafts being axially stationary with respect to said top plate, and means for permitting said first, second and third helically grooved cam shafts to extend downward at least into said bottom plate during reciprocation of said top plate whereby motion of said first, second and third helically grooved cam shafts into said top plate is not required.

2. A tapping attachment according to claim 1 in which the tapping station comprises a locking ring secured to the top of the extension, an opening in the top of the extension in communication with the interior of the locking ring, a tapping head removably coupled to the locking ring, an elongated internally threaded lead screw bushing slidably carried within the tapping head, an internally and externally threaded lead screw threadably carried within the lead screw bushing and a tap chuck threadably carried within the lead screw bushing.

3. A tapping attachment according to claim 2 in which the lead screw bushing is formed with at least one longitudinal key way and the chuck driving gear is provided with a hollow shaft to drivably receive therethrough the lead screw bushing.

4. A tapping attachment according to claim 3 in which the hollow shaft of the chuck driving gear is formed with an inwardly extending key engagable with the keyway of the lead screw to advance and retract the lead screw into and out of a work part.

5. A tapping attachment according to claim 4 in which the locking ring is provided with an inwardly extending flange, said flange being notched at spaced intervals and a cup shaped hollow tapping head having an open end and end wall on the opposite end, said head having outwardly extending detents thereon at the open end receivable through the notches in the locking ring to removably secure the tapping head to the locking ring.

6. A tapping head according to claim 5 in which the end wall of the tapping head is bored to receive the lead screw bushing therethrough, said lead screw bushing is cylindrical in shape and provided with an outwardly extending flange portion spaced from the bottom of said bushing.

7. A tapping device for a punch press or the like comprising a top plate, a bottom plate opposite the top plate, electrical power means to reciprocate the top plate with respect to the bottom plate, a top gear block secured to the top plate, a bottom gear block secured to the bottom plate, a gear train carried within each of the gear blocks, a helically grooved first cam shaft secured at one end to the top gear box and extending therefrom, a first helically splined bushing carried within the bottom gear box in driving engagement with the first cam shaft, a first gear within the bottom gear train around the first bushing and secured thereto, a floating second gear within the bottom gear train in mesh with said first gear, a second helically grooved cam shaft operatively coupled at one end to the floating second gear and extending outwardly thereof toward the top gear block, a second helically splined bushing within the top gear block in driving engagement with the second camp shaft, a third gear within the top gear train around the second bushing and secured thereto, a fourth gear within the top gear train in mesh with the third gear, a third helically grooved cam shaft, secured at one end to the fourth gear and extending outwardly thereof toward the bottom gear block, a third helically splined bushing within the bottom gear block in driving engagement with the third cam shaft, a fifth gear around the third bushing and secured thereto, an extension on the bottom gear block, a pinion gear member within the extension in mesh with the fifth gear, a tap receiving tapping station carried by the extension, a chuck assembly on the tapping station, a chuck driving gear in the chuck assembly, a tapping head on the said station, a threaded bushing in said tapping head for advancing the chuck toward a work part, a speed reducing gear train interconnecting the pinion gear member and chuck driving gear, whereby rapid reciprocation of the top and bottom plates toward and away from each other will be translated into rotation of the chuck assembly at a suitable tapping speed, fail safe means within the tapping head responsive to vertical movement of the threaded bushing to interrupt the plate reciprocation means, a locking ring in said tapping station, an opening in the top of the extension in communication with the interior of the locking ring, an elongated internally threaded lead screw bushing slidably carried within the tapping head, an internally and externally threaded lead screw threadably carried within the lead screw bushing, a tap chuck threadably carried within the lead screw bushing, an inwardly extending flange on said locking ring, said inwardly extending flange including notches at spaced intervals, a cup-shaped hollow tapping head having an open end and an end wall on an opposite end thereof, said head having outwardly extending detents thereon at the open end receivable through the notches in the locking ring to removably secure the tapping head to the locking ring, a flat spring plate is disposed across the interior of the locking ring beneath the inwardly extending flange and is yieldingly urged in the direction of said flange by springs carried by the top of the extension.

8. A tapping head according to claim 7 in which a plurality of coil springs are disposed within the hollow tapping head between the lead screw flange and the end wall to yieldably urge the lead screw in the direction of the work part.

9. A tapping head according to claim 8 in which the lead screw bushing flange is formed with a plurality of electrically conductive contact points, the spring plate is made of a dielectric material and carries an electrically conductive contact thereon disposed in the path of the flange contact points, said conductive contact being part of the circuit of the electrical power means whereby any separation between the spring plate contact and the flange contact points will break the ground connection and stop the said power source.

10. A tapping attachment according to claim 9 in which the electrically conductive contact is an arcuate strip and the flange contact points are on the bottom of the said flange and are brought into wiping contact with the said arcuate strip as the tapping head is locked in place beneath the locking ring flange.

11. A tapping device for a punch press comprising:
a top plate;
a bottom plate opposite said top plate;
means for reciprocating said top plate with respect to said bottom plate;
at least first and second helically grooved cam shafts;
means for rigidly affixing a first end of said first helically grooved cam shaft to said top plate;
means for rotationally affixing said second helically grooved cam shaft to said top plate and to said bottom plate;
a first helically splined bushing engaging said first helically grooved cam shaft;
a second helically splined bushing engaging said second helically grooved cam shaft;
gear means for operative gear interconnection of said first and second helically splined bushings;
a tapping station;
a tap chuck in said tapping station;
gear means for rotating said tap chuck by said second helically splined bushing;
electrical means in said tapping station for detecting a predetermined vertical force on said tap chuck;

said means for reciprocating being responsive to said electrical means to turn off said means for reciprocating when said predetermined vertical force is exceeded; and at least first and second holes in said bottom plate for permitting said at least first and second helically grooved cam shafts;

said means for rotationally affixing said second helically grooved cam shaft including means for axially affixing said second helically grooved cam shaft to said top plate whereby axial motion of said first and second helically grooved cam shafts with respect to said top plate is prevented.

* * * * *